(12) United States Patent
Morris et al.

(10) Patent No.: US 7,284,266 B1
(45) Date of Patent: Oct. 16, 2007

(54) SYSTEM AND METHOD FOR SECURE BIOMETRIC IDENTIFICATION

(75) Inventors: Martin Morris, Vista, CA (US); Andrew Senyei, La Jolla, CA (US); Jeff Calcagno, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/531,720

(22) Filed: Mar. 21, 2000

(51) Int. Cl.
*G06F 15/16* (2006.01)
*G06F 17/30* (2006.01)
*G06F 7/04* (2006.01)
*G06G 7/58* (2006.01)
*G06K 19/00* (2006.01)
*H04L 9/00* (2006.01)
*H03M 1/68* (2006.01)
*H04N 7/16* (2006.01)

(52) U.S. Cl. .............................. 726/9; 713/186; 726/28
(58) Field of Classification Search ................ 713/186, 713/159, 170; 705/61–64; 382/115; 726/28
See application file for complete search history.

(56) References Cited

U.S. PATENT DOCUMENTS 3,611,290 A * 10/1971 Luisi et al. .................. 382/125
3,699,519 A * 10/1972 Campbell .................... 382/125

(Continued)

FOREIGN PATENT DOCUMENTS

EP           292249 A2 * 11/1988

(Continued)

OTHER PUBLICATIONS

Schneier, Bruce. Applied Cryptography, Second Edition, 1996 John Wiley & Sons, pp. 37 & 185-186.*

(Continued)

*Primary Examiner*—Gilberto Barrón, Jr.
*Assistant Examiner*—Michael J Simitoski
(74) *Attorney, Agent, or Firm*—McAndrews, Held & Malloy, Ltd.

(57) ABSTRACT

A system and method for secure biometric identification. The inventive system includes a mobile unit and a server. The mobile unit is adapted to receive biometric input and provide a first signal in response thereto. In the illustrative implementation, the mobile unit is a Personal Digital Assistant (PDA) and the biometric input is provided by a fingerprint sensor mounted thereon. A first transceiver is mounted on the PDA for transmitting the first signal and receiving a second signal in response thereto. The PDA is adapted to encrypt the first signal and decrypt the second signal. A secure device is mounted at the PDA. The secure device has two modes of operation: a first locked mode by which access thereto is prohibited and a second unlocked mode by which access thereto is enabled on receipt of the second signal. In the illustrative implementation, the secure device is an encrypted database for which the second signal is a decryption key. The server unit includes a second transceiver for receiving the first signal transmitted via the wireless link. The first and second transceivers are adapted to operate in accordance with the Bluetooth specification. The server is equipped with a system for authenticating the biometric data and providing the second signal in response thereto. The second signal is then communicated to the mobile unit where it is utilized to access the secure device, e.g., encrypted database.

13 Claims, 7 Drawing Sheets

U.S. PATENT DOCUMENTS

| | | | | |
|---|---|---|---|---|
| 3,859,633 | A | * | 1/1975 | Ho et al. .................... 382/125 |
| 4,210,899 | A | * | 7/1980 | Swonger et al. ............ 382/125 |
| 4,405,829 | A | | 9/1983 | Rivest et al. .............. 178/22.1 |
| 4,525,859 | A | * | 6/1985 | Bowles et al. .............. 382/125 |
| 4,747,147 | A | * | 5/1988 | Sparrow .................... 382/125 |
| 4,790,564 | A | * | 12/1988 | Larcher et al. ............... 283/69 |
| 4,795,898 | A | * | 1/1989 | Bernstein et al. ........... 235/487 |
| 4,817,183 | A | * | 3/1989 | Sparrow .................... 382/125 |
| 5,237,614 | A | * | 8/1993 | Weiss ......................... 713/159 |
| 5,467,403 | A | * | 11/1995 | Fishbine et al. ............ 382/116 |
| 5,469,506 | A | * | 11/1995 | Berson et al. .............. 713/186 |
| 5,490,139 | A | | 2/1996 | Baker et al. ................. 370/60 |
| 5,572,528 | A | | 11/1996 | Shuen .................... 370/85.13 |
| 5,636,216 | A | | 6/1997 | Fox et al. ................... 370/402 |
| 5,652,751 | A | | 7/1997 | Sharony .................... 370/227 |
| 5,696,903 | A | | 12/1997 | Mahany |
| 5,699,353 | A | | 12/1997 | Kent .......................... 370/315 |
| 5,708,655 | A | | 1/1998 | Toth et al. .................. 370/313 |
| 5,742,598 | A | | 4/1998 | Dunn et al. ................. 370/393 |
| 5,754,547 | A | | 5/1998 | Nakazawa .................. 370/401 |
| 5,812,531 | A | | 9/1998 | Cheung et al. ............. 370/255 |
| 5,825,772 | A | | 10/1998 | Dobbins et al. ............ 370/396 |
| 5,835,061 | A | | 11/1998 | Stewart ...................... 342/457 |
| 5,845,081 | A | | 12/1998 | Rangarajan et al. ........ 395/200 |
| 5,850,592 | A | | 12/1998 | Ramanathan |
| 5,854,899 | A | | 12/1998 | Callon et al. ............... 395/200 |
| 5,872,834 | A | * | 2/1999 | Teitelbaum .............. 379/93.03 |
| 5,917,913 | A | * | 6/1999 | Wang ........................... 705/67 |
| 5,982,898 | A | * | 11/1999 | Hsu et al. ................... 713/156 |
| 5,983,098 | A | | 11/1999 | Gerszberg et al. .......... 455/426 |
| 6,016,476 | A | * | 1/2000 | Maes et al. ..................... 705/1 |
| 6,088,802 | A | * | 7/2000 | Bialick et al. .............. 713/200 |
| 6,111,977 | A | * | 8/2000 | Scott et al. ................. 382/124 |
| 6,307,956 | B1 | * | 10/2001 | Black ......................... 382/124 |
| 6,532,368 | B1 | * | 3/2003 | Hild et al. .................. 455/515 |
| 6,581,161 | B1 | * | 6/2003 | Byford ....................... 173/182 |
| 2002/0049073 | A1 | * | 4/2002 | Bell ............................ 455/552 |

FOREIGN PATENT DOCUMENTS

WO     WO 99/14897     3/1999

OTHER PUBLICATIONS

Anderson, S. et al. "A Single Chip Sensor & Image Processor for Fingerprint Verification", 1991 IEEE Custom Integrated Circuits Conference.*

Chen, Z. et al. "A Topology-Based Matching Algorithm for Fingerprint Authentication", 1991 IEEE.*

Fitzgerald, Karen. "The quest for intruder-proof computer systems", Aug. 1989 IEEE Spectrum.*

Miller, Benjamin. "Vital Signs of Identity", Feb. 1994 IEEE Spectrum.*

Haartsen, Jaap, "Bluetooth—the universal radio interface for ad hoc, wireless connectivity", Ericsson Review, Se, Ericsson (3) : 110-117, (1998) .

Haartsen, Jaap, "Bluetooth-The universal radio interface for *ad hoc*, wireless connectivity," *Ericsson Review*, No. 3, pp. 110-117, (1998).

"Specification of the Bluetooth System, Core, Version 1.0B," *Bluetooth SIG Specifications*, pp. 18-42, (Dec. 1, 1999).

Specification of the Bluetooth System, pp. 1-1000, (Jul. 1999).

"PDMF System Manager's Guide PDMF-Ref-5.1," http://www.geneseo.edu/pmdf/sysman/book_1.html#chapter_1, (Mar. 16, 1999) .

* cited by examiner

SYSTEM AND METHOD FOR SECURE BIOMETRIC IDENTIFICATION

BACKGROUND OF THE INVENTION

1. Field of the Invention

The present invention relates to electronic devices and systems. More specifically, the present invention relates to systems and methods for providing user identification and/or authentication for electronic devices and systems.

2. Description of the Related Art

Currently, whenever a user wishes to access a computer-based system containing private data, the user must often identify himself, usually with a password. Passwords notoriously provide poor security as users either chose very simple, easily ascertained passwords or, if they use more difficult passwords, users often write them down, making them subject to theft.

In the end, most forms of encryption, as well as access controls such as passwords and even locks, serve a single purpose of identifying the person requesting access.

Hence, there is a need in the art for a reliable, secure system or method of authenticating the identity of a user. Ideally, the system or method would be effective such that one would not need to memorize passwords or utilize other authenticating devices such as keys to access computers and other electronic devices and systems.

SUMMARY OF THE INVENTION

The need in the art is addressed by the system and method for secure biometric identification of the present invention. The inventive system includes a mobile unit and a server. In the illustrative embodiment, the mobile unit is adapted to receive biometric input and provide a first signal in response thereto. A first transceiver is included for transmitting the first signal and receiving a second signal in response thereto. In an illustrative embodiment, a secure device is operationally coupled to the mobile unit. The secure device has two modes of operation: a first locked mode by which access thereto is prohibited and a second unlocked mode by which access thereto is enabled on receipt of the second signal.

The server unit includes a second transceiver for receiving the first signal transmitted via the wireless link. The server is equipped with a system for authenticating the biometric data and providing the second signal in response thereto. The second signal is then communicated to the mobile unit where it is utilized to access the secure device.

In the illustrative embodiment, the first and second transceivers are adapted to operate in accordance with the Bluetooth specification. Preferably, the mobile unit is adapted to encrypt the first signal and decrypt the second signal. In the illustrative implementation, biometric input is provided by a fingerprint sensor mounted on a Personal Digital Assistant. The secure device in the illustrative implementation is an encrypted database for which the second signal is a decryption key.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As mentioned above, and in accordance with the present teachings, the inventive system includes a mobile unit and a server. In the illustrative embodiment, the mobile unit is a Personal Digital Assistant (PDA) adapted to receive biometric input from a fingerprint sensor and provide a first signal in response thereto. Personal Digital Assistants are well known and widely used.

Figure 1A:
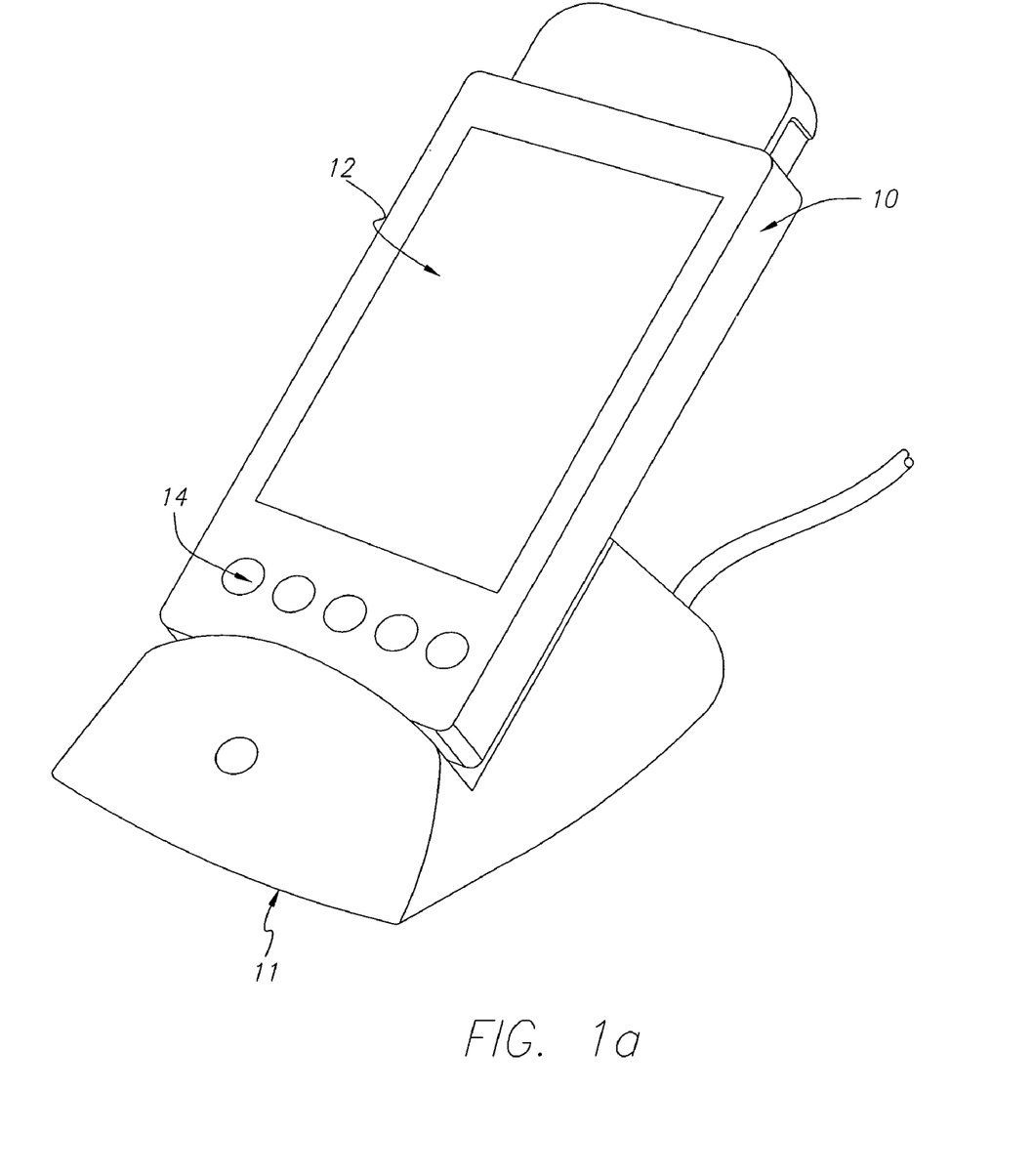
FIG. 1a is a perspective front view of an illustrative implementation of a PDA adapted for use in accordance with the teachings of the present invention.
Figure 1B:
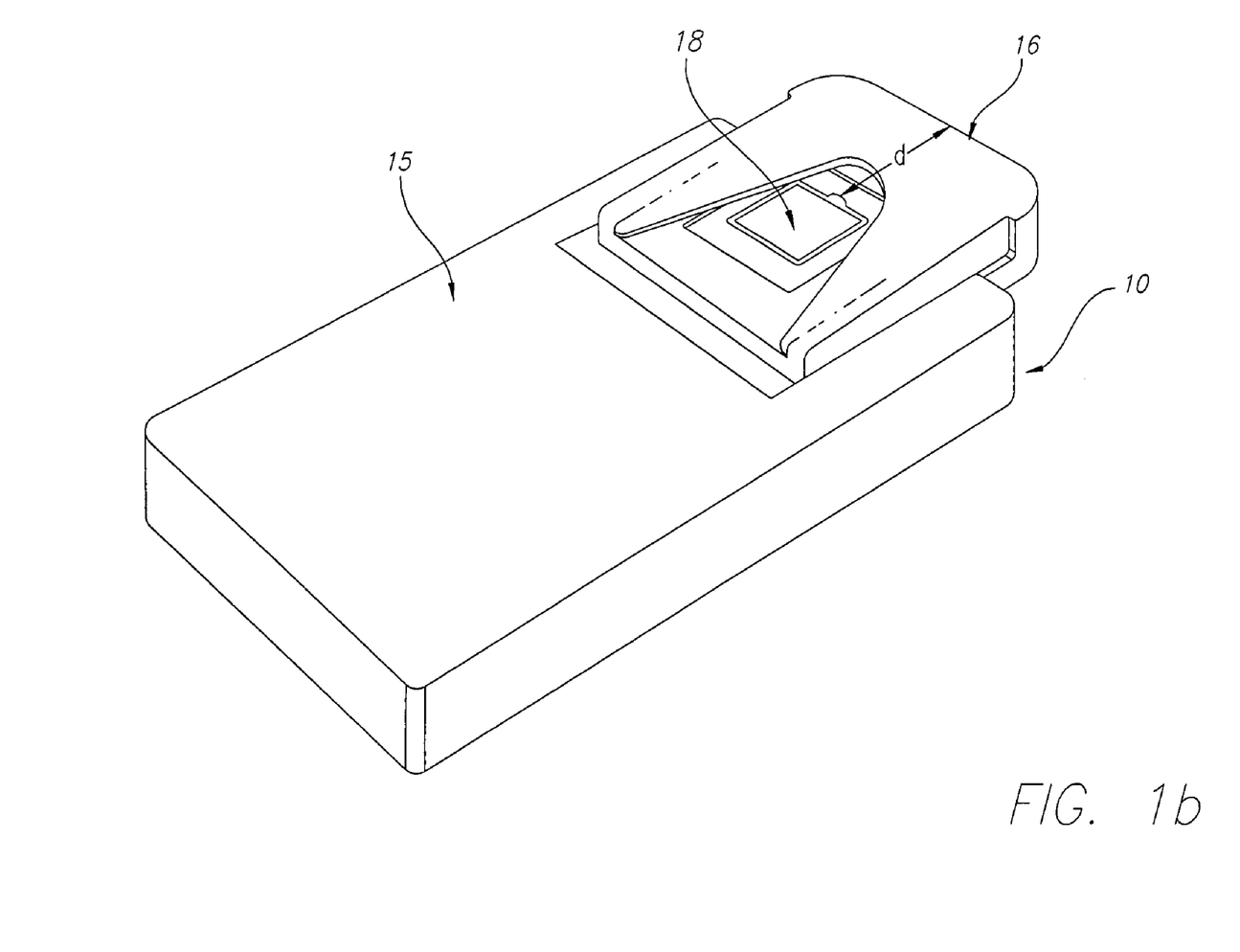
FIG. 1b is a perspective rear view thereof.

FIG. 1a is a perspective front view of an illustrative implementation of a PDA adapted for use in accordance with the teachings of the present invention. FIG. 1b is a perspective rear view thereof. In the preferred embodiment, the PDA is implemented in accordance with the teachings of U.S. patent application Ser. No. 09/531,859, filed on Mar. 21, 2000, now abandoned, entitled "SYSTEM AND METHOD FOR SECURE USER IDENTIFICATION WITH BLUETOOTH ENABLED TRANSCEIVER AND BIOMETRIC SENSOR IMPLEMENTED IN A HAND-HELD COMPUTER", inventor Martin Morris, which teachings are hereby incorporated by reference. As disclosed in the reference application, in the best mode, the PDA 10 is equipped with an expansion slot 12 such as the Visor™ handheld Computer manufactured and sold by Handspring and disclosed more fully at the Handspring website (that was previously cited in the present application as originally filed). As shown in FIG. 1b, the expansion slot 12 is adapted to receive a card 14 on which a biometric device, in the illustrative embodiment—a fingerprint sensor 16, is disposed. In addition, in accordance with the present teachings, a transceiver 22 is also disposed on the card 14. In the preferred embodiment, the transceiver 22 is adapted to operate in accordance with the BLUETOOTH SPECIFICATION VERSION 1.0A CORE, published in July 1999. When the card is inserted in the expansion slot, it interfaces electrically with the system bus of the PDA and provides an electrical circuit depicted in FIG. 2.

Figure 2:
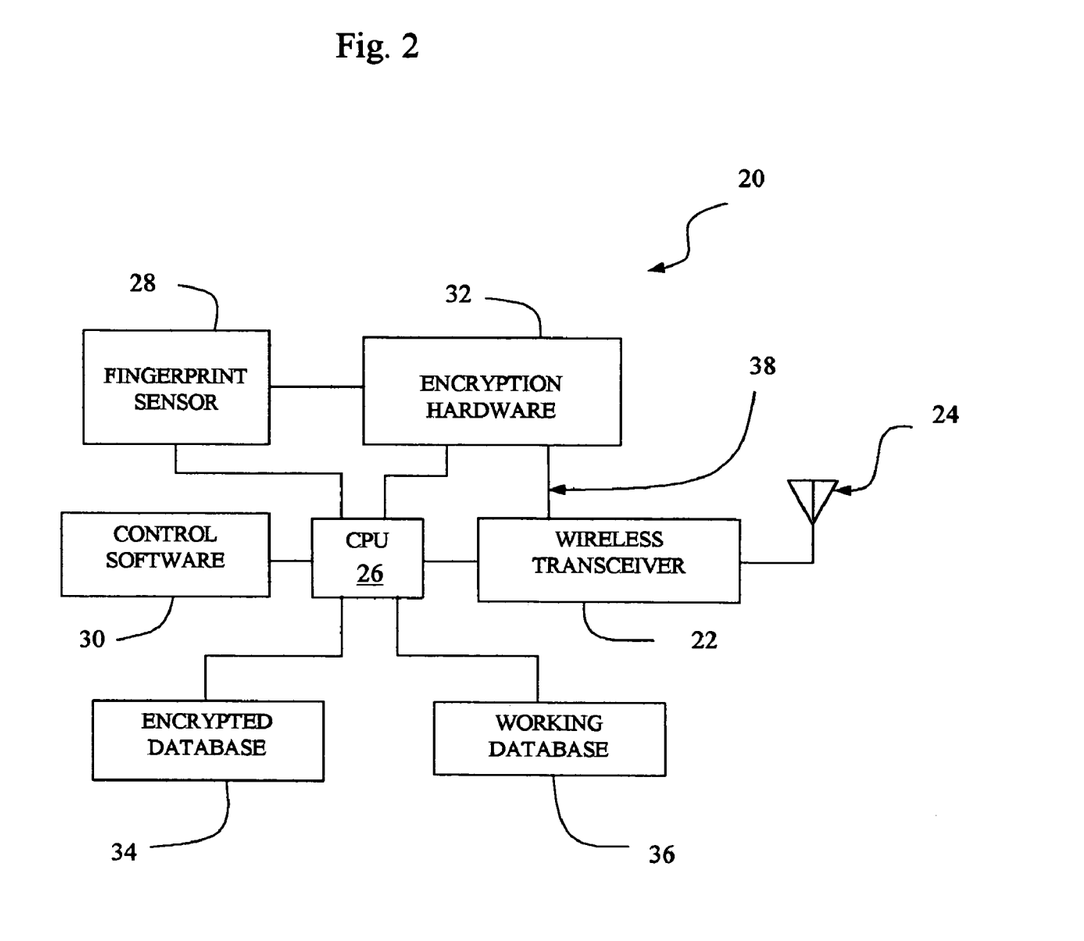
FIG. 2 is a block diagram of an illustrative implementation of a mobile unit subsystem constructed in accordance with the present teachings.

FIG. 2 is a block diagram of an illustrative implementation of a mobile unit subsystem constructed in accordance with the present teachings. The mobile unit subsystem 20 includes the wireless transceiver 22 which is adapted to communicate with a central processing unit (CPU) 26 of the PDA. The central processing unit 26 receives biometric data from the fingerprint sensor 28. In accordance with the present teachings, data from the fingerprint sensor 28 is encrypted in either in software 30 adapted to run on the CPU 26 and/or in optional hardware 32. Encryption hardware and software are well known in the art. The control software 30 also enables the CPU 26 to selectively access and control the mobile unit components via a system bus shown generally at 38.

The encrypted biometric data is either used locally to access an encrypted database 34 or, preferably, transmitted over a link such as a wireless link to a server subsystem via the transceiver 22 and antenna 24. The server subsystem is depicted in FIG. 3.

Figure 3:
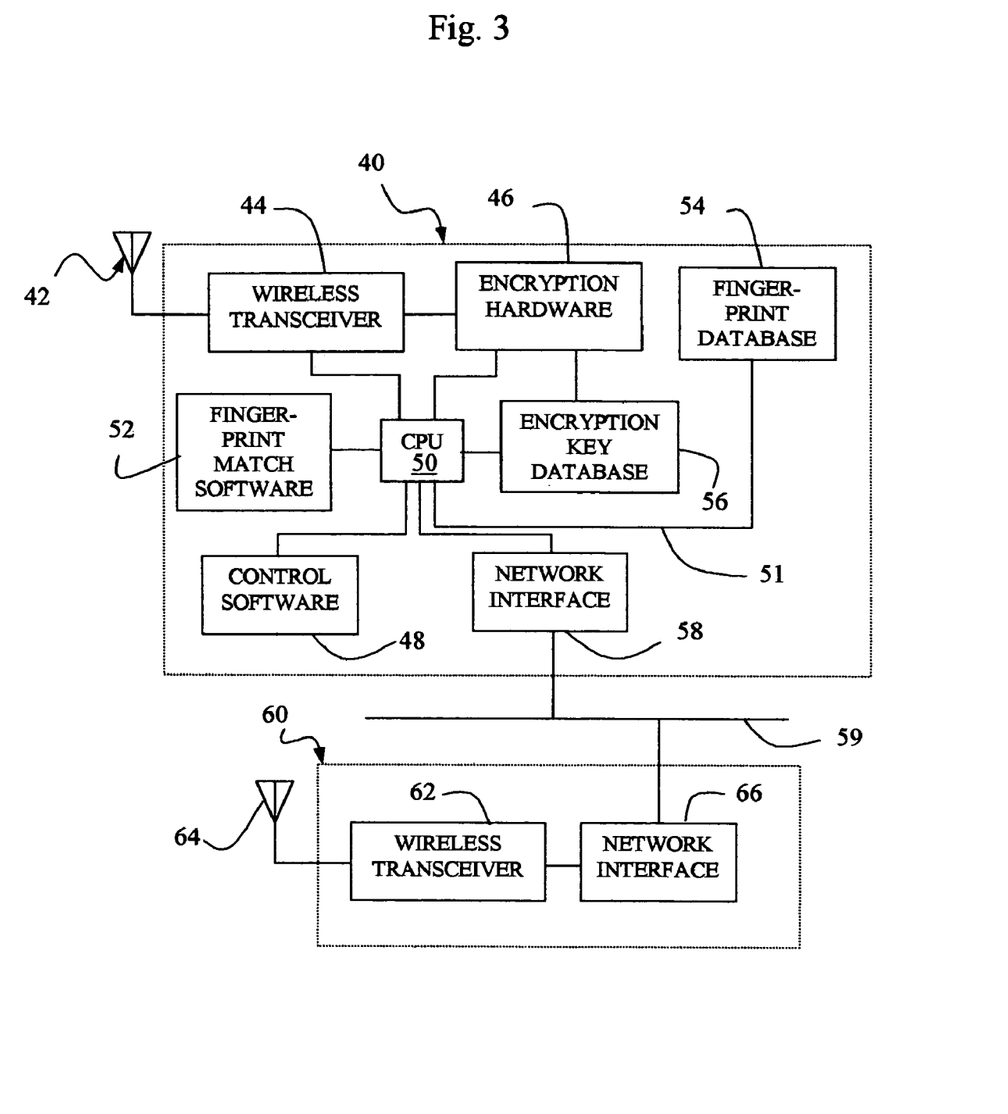
FIG. 3 is a block diagram of an illustrative implementation of a server subsystem for use in the system for secure biometric identification of the present invention.

FIG. 3 is a block diagram of an illustrative implementation of a server subsystem for use in the system for secure biometric identification of the present invention. The encrypted biometric data signal is received by a server antenna 42 and a second wireless Bluetooth enabled transceiver 44. The received signal is decrypted by an optional conventional hardware based decryption circuit 46 and/or by decryption software implemented in control software 48 adapted to run on a server CPU 50. Those skilled in the art will appreciate that the decryption scheme utilized on the server is designed to match that of the mobile unit 20. In the preferred embodiment, the RSA public key encryption scheme is used. This scheme is disclosed more fully in U.S. Pat. No. 4,405,829 entitled Cryptograpgic Communications System & Method, issued Sep. 29, 1983 to Rivest, et al. the teachings of which are incorporated herein by reference. The server control software also controls the CPU 50 to selectively access and control the components of the server subsystem 40 via a server subsystem bus shown generally at 51.

In accordance with the present teachings, the decrypted biometric data, in the illustrative implementation, the decrypted fingerprint, is compared by fingerprint matching software 52 to a database 54 of biometric data, i.e., fingerprints. Fingerprint matching software is well known in the art. Such software may be purchased from Veridicom, Inc. of Santa Clara, Calif.

When a match is achieved, a user is identified and an authentication key specific to the identified mobile user is retrieved from an encryption key database by the CPU 50 via the bus 51. In the preferred embodiment, the retrieved encryption key is encrypted by the resident encryption scheme either by the hardware unit 46, if provided, and/or by the encryption software implemented in the control software 48. The encrypted encryption key is then transmitted back to the mobile unit 20 via the wireless link through the transceiver 44 and antenna 42. As an alternative, the encrypted encryption key may be provided to a network 59 via a first network interface card or circuit 58 and a second network interface card or circuit 66. The network 59 facilitates the communication of the encrypted encryption key to the mobile unit 20 via a wireless transceiver 62 and an antenna 64. This configuration may be preferred if the second antenna 64 is closer to the mobile unit 20.

In addition, those skilled in the art will appreciate that the inventive system can be implemented such that the encrypted biometric data is transmitted from a first PDA 20 and the encrypted encryption key or other information is sent to a second mobile unit or over a network to second server or network of devices.

Returning to FIG. 2, on receipt of the encrypted encryption key from the server subsystem 40 via the antenna 24 and the wireless transceiver 22, the mobile unit CPU 26 decrypts the encrypted key using the resident software and/or hardware decryption facility 30 and 32, respectively. The decrypted encryption key is then used by the CPU 26 to access a secure device. In an illustrative embodiment, the secure device is an encrypted database 34 mounted on the mobile unit. Those skilled in the art will appreciate that the secure device need not be mounted on the mobile unit 20. As an alternative, the secure device may be coupled to the mobile unit via the wireless link.

In any event, the secure device, i.e., database 34, has two modes of operation: a first locked mode by which access thereto is prohibited and a second unlocked mode by which access thereto is enabled on receipt of the decrypted encryption key. For optimal security, the decryption key for the encrypted database 34 should not be stored on the mobile unit. On receipt of the decrypted decryption key, a working copy 36 of the encrypted database 34 is created.

Figure 4A:
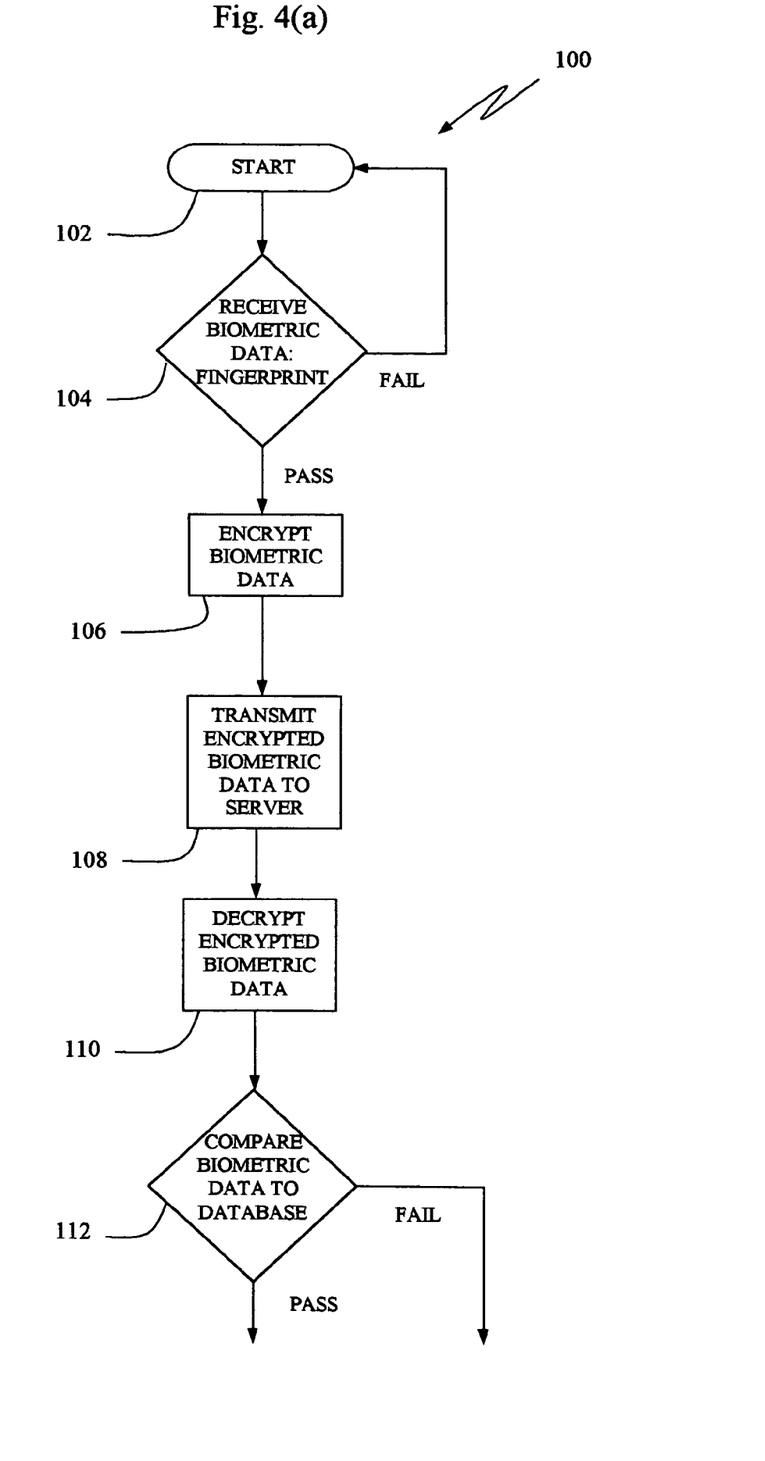
FIG. 4 is a flow diagram illustrative of a method for secure biometric identification implemented in accordance with the teachings of the present invention.
Figure 4B:
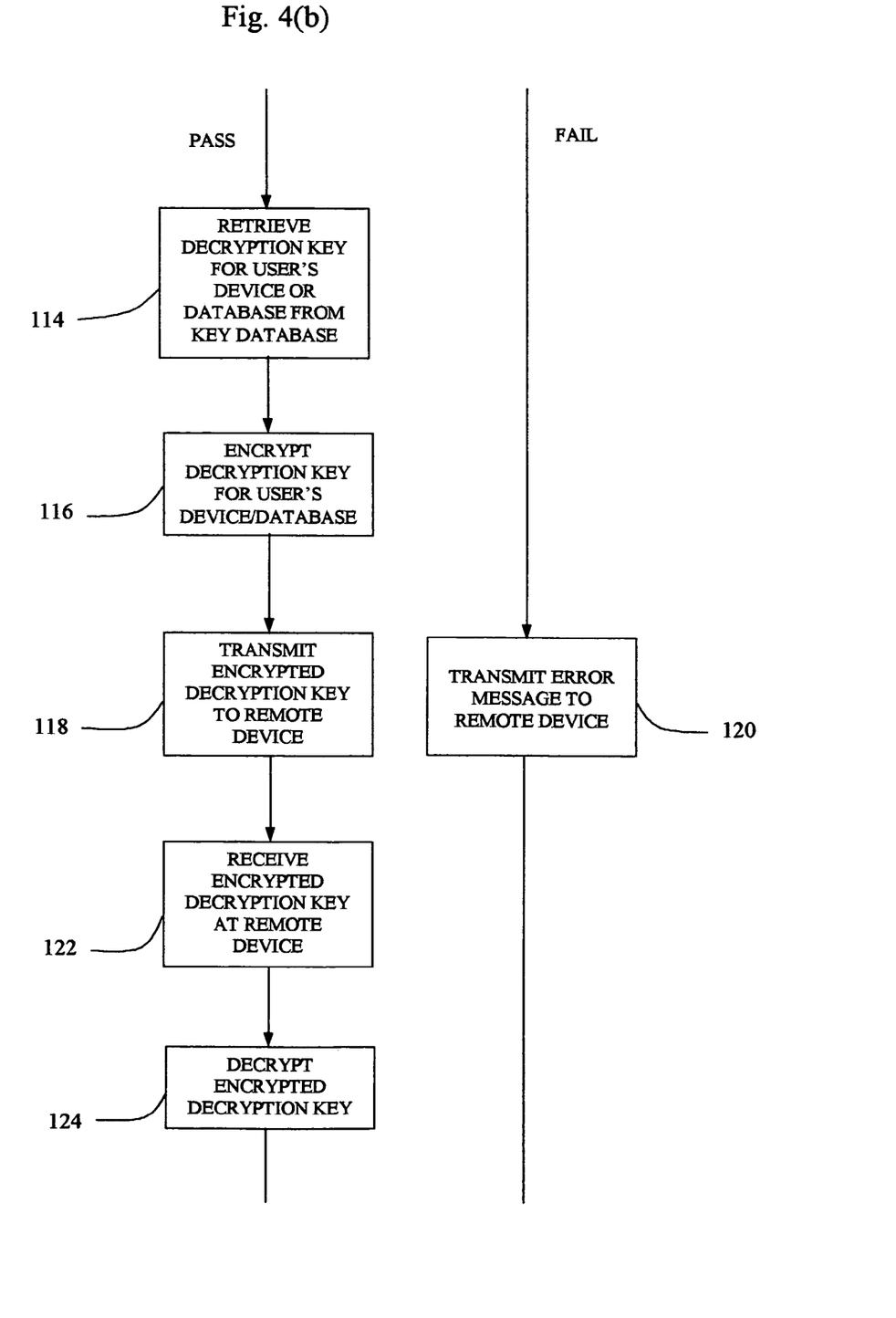
Figure 4C:
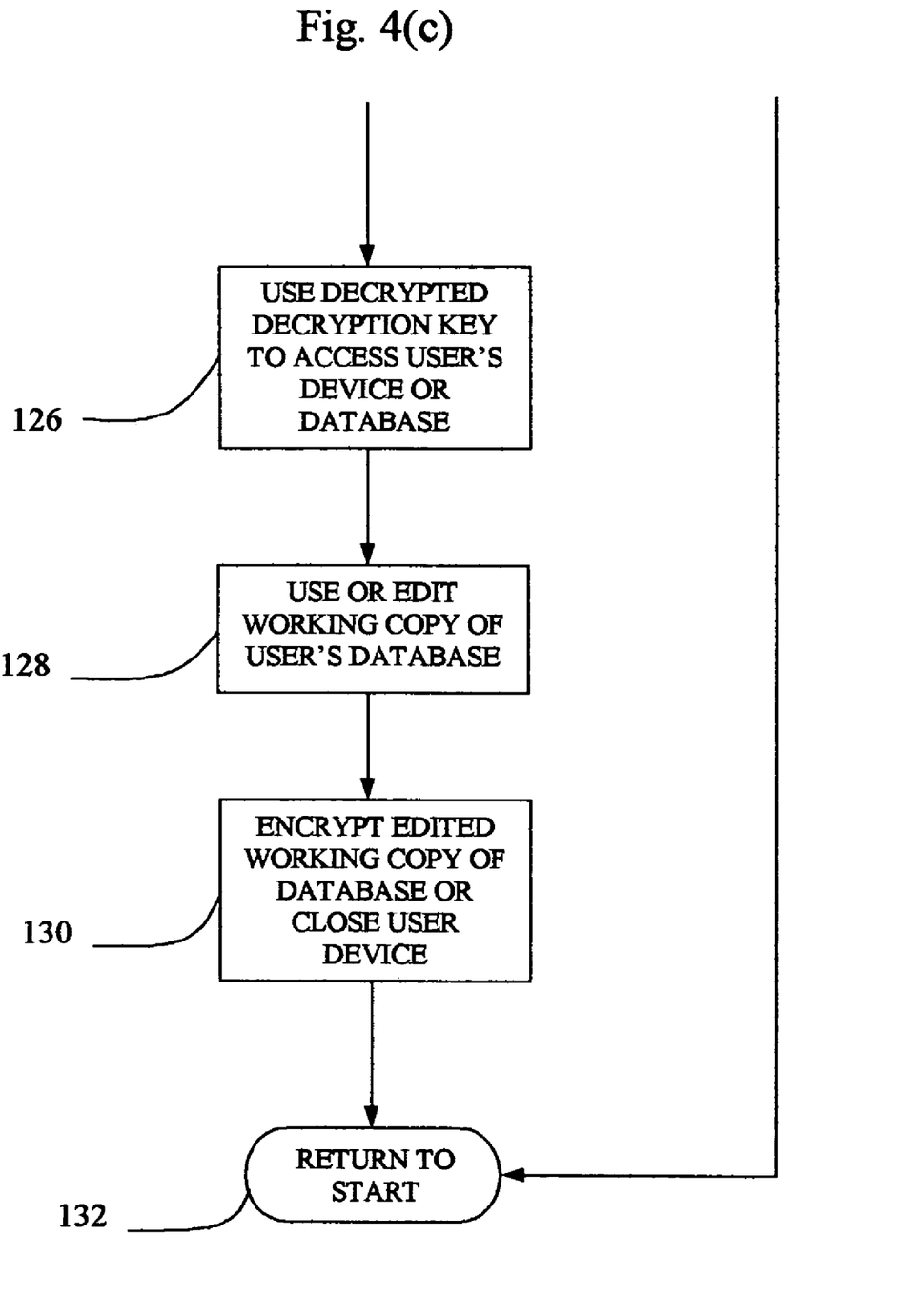

FIG. 4 is a flow diagram illustrative of a method for secure biometric identification implemented in accordance with the teachings of the present invention. As shown in FIGS. 2, 3 and 4 when a user in possession of the mobile unit 20 wishes to access the secure device 34, he/she places a finger on the fingerprint sensor 28 and starts the access control program 100.

At step 104, the CPU 26 running the access control software 30 scans the fingerprint from sensor 28 and, at step 106, encrypts it with the public key of the authentication server 40 by using the encryption software or hardware 30, 32.

At step 108, the resulting encrypted message is sent to the server 40 via the transceiver 22 and antenna 24 on the mobile unit 20 and the antenna 42 and transceiver 44 of the server 40. As mentioned above, as an alternative, the encrypted fingerprint is sent via the access point 60 and local or wide-area network 59 when the server 40 is not within direct radio range of the mobile unit 20.

At step 110, when the authentication request is received at the server 40, the server CPU 50 decrypts the message using its secret key and the encryption hardware and/or software 46 and 48, respectively.

At step 112, the CPU 50 then utilizes the fingerprint match software 52 to compare the decrypted fingerprint to the database of authorized fingerprints 54 to determine if the request is valid.

If the request is valid, then, at step 114, the decryption key for the user's encrypted database 34 (FIG. 2) is retrieved from the key database 56 (FIG. 3).

At step 116, the key is encrypted via the encryption hardware or software 46, 48 (FIG. 3) and, at step 118, sent back to the mobile unit 20 via the same path from which the request was originally received.

At the mobile unit 20, at steps 122 and 124, the key is received and decrypted.

At step 126, the retrieved key used to make a temporary working copy 36 of the encrypted database 34.

At step 128 this temporary copy 36 is either read or edited. If edited, then at step 130 the edited working copy is deleted or rewritten to encrypted form as soon as the user completes his operation.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A mobile unit for use in a system for secure biometric identification, comprising:
   a biometric sensor that generates biometric data;
   a central processing unit operatively coupled to said biometric sensor;
   software running on said central processing unit;
   a transceiver operatively coupled to said sensor; and
   an encrypted database operatively coupled to said central processing unit,
   wherein said biometric sensor and said transceiver are part of a card that is received by said mobile unit,
   wherein said transceiver transmits biometric information that is based on said biometric data,
   wherein said transceiver receives a cryptographic key in response to the said transmitted biometric information,
   wherein said cryptographic key is used to provide a temporary decrypted version of said encrypted data on the mobile unit.

2. A system for secure biometric identification, comprising:
   a handheld computer enabled device that receives a card, the card comprising a fingerprint sensor and a first wireless transceiver, said fingerprint sensor providing a first set of biometric data, said first wireless transceiver transmitting a first signal representative of said biometric data;
   means disposed on said device for encrypting said biometric data;
   in a computer system, a second wireless transceiver for receiving said first signal and providing a second signal in response thereto;
   in a computer system, means for decrypting said second signal to provide said first set of biometric data;
   in a computer system, means for authenticating said first set of biometric data and providing a third signal in response thereto, said means for authenticating including means for comparing said first set of biometric data to plural second sets of biometric data;
   in a computer system, means for providing an encrypted decryption key, in response to said third signal, to means for decrypting said encrypted decryption key; and
   in said device, a secure device in communication with said means for decrypting said encrypted decryption key and responsive to said decryption key,
   wherein the secure device stores an encrypted database,
   wherein said decryption key decrypts the encrypted database and generates a temporary working decrypted copy of said database.

3. The system of claim 2 wherein said first transceiver comprises a Bluetooth-enabled transceiver adapted to operate in accordance with a Bluetooth specification.

4. The system of claim 2 wherein said second transceiver comprises a Bluetooth-enabled transceiver.

5. The system of claim 2 wherein said means for comparing includes biometric matching software.

6. The system of claim 5 wherein said biometric matching software comprises fingerprint matching software.

7. The system of claim 2 wherein said decryption key comprises a public decryption key.

8. The system of claim 2 wherein said handheld device comprises a Personal Digital Assistant.

9. A system for secure biometric identification, comprising:
   a computer-enabled device;
   a biometric sensor mounted on a card that is received by said device;
   a first central processing unit in communication with said sensor;
   a first wireless transceiver mounted on said card and coupled to said first central processing unit;
   a second wireless transceiver in communication with said first wireless transceiver;
   a second central processing unit in communication with said second transceiver;
   software running on said second central processing unit for authenticating a signal transmitted by said first transceiver and received by said second transceiver and providing a decryption key in response thereto; and
   a secure device mounted on said computer-enabled device and responsive to said decryption key,
   wherein said secure device stores an encrypted database that includes private data,
   wherein said decryption key decrypts said encrypted database, and
   wherein said decryption key is used by the secure device to decrypt and generate a temporary working decrypted copy of said database.

10. The system of claim 9 wherein said first transceiver comprises a Bluetooth-enabled transceiver.

11. The system of claim 9 wherein said second transceiver comprises a Bluetooth-enabled transceiver.

12. The system of claim 9 wherein said decryption key comprises a public decryption key.

13. The system of claim 9 wherein said computer-enabled device comprises a Personal Digital Assistant.

* * * * *

UNITED STATES PATENT AND TRADEMARK OFFICE
CERTIFICATE OF CORRECTION

PATENT NO. : 7,284,266 B1  Page 1 of 1
APPLICATION NO. : 09/531720
DATED : October 16, 2007
INVENTOR(S) : Martin Morris, Andrew Senyei and Jeff Calcagno

It is certified that error appears in the above-identified patent and that said Letters Patent is hereby corrected as shown below:

Column 5, lines 49-50 delete "wherein said decryption key decrypts the encrypted database and generates a temporary working decrypted copy of said database." and insert --wherein said decryption key is used by the secure device to decrypt and generate a temporary working decrypted copy of said database.--

Column 6, lines 37-39 delete "wherein said decryption key is used by the secure device to decrypt and generate a temporary working decrypted copy of said database." and insert --wherein said decrypted database is accessible in the form of a temporary working copy of the decrypted datyabase.--

Signed and Sealed this

First Day of April, 2008

JON W. DUDAS
*Director of the United States Patent and Trademark Office*